(12) United States Patent
Xu et al.

(10) Patent No.: US 7,102,081 B2
(45) Date of Patent: Sep. 5, 2006

(54) DECORATIVE COVER PLATE ASSEMBLY

(76) Inventors: Shaojie Xu, 8808 W. 125th St., Overland Park, KS (US) 66213; Hui Xu, RM. #401, Building #8, No. 768 Gongping Road (Dongfangdushi), Shanghai (CN) 200086

( * ) Notice: Subject to any disclaimer, the term of this patent is extended or adjusted under 35 U.S.C. 154(b) by 0 days.

(21) Appl. No.: 10/973,902

(22) Filed: Oct. 27, 2004

(65) Prior Publication Data

US 2006/0086525 A1  Apr. 27, 2006

(51) Int. Cl.
*H02G 3/14* (2006.01)
*H05K 5/03* (2006.01)

(52) U.S. Cl. ............................ 174/66; 174/67; 220/241
(58) Field of Classification Search ................ 174/66, 174/67; 220/241, 242; D8/353; D13/177; 312/328
See application file for complete search history.

(56) References Cited

U.S. PATENT DOCUMENTS

| | | | |
|---|---|---|---|
| 3,953,933 A | 5/1976 | Goldstein | |
| 4,631,354 A | 12/1986 | Boteler | |
| 4,800,239 A | 1/1989 | Hill | |
| 4,835,343 A | 5/1989 | Graef et al. | |
| 5,073,681 A | 12/1991 | Hubben et al. | |
| D327,212 S | 6/1992 | Hubben et al. | |
| 5,153,816 A | 10/1992 | Griffin | |
| 5,180,886 A | 1/1993 | Dierenbach et al. | |
| 5,189,259 A | 2/1993 | Carson et al. | |
| 5,456,373 A | 10/1995 | Ford | |
| 5,675,125 A | 10/1997 | Hollinger | |
| 5,723,817 A | 3/1998 | Arenas et al. | |
| 5,895,888 A * | 4/1999 | Arenas et al. | 174/66 |
| 6,218,617 B1 | 4/2001 | Estanislao et al. | |
| 6,281,440 B1 | 8/2001 | Baldwin et al. | |
| D461,113 S | 8/2002 | Capella | |
| D465,144 S | 11/2002 | Lai | |
| D473,528 S | 4/2003 | Wengrower | |
| D484,392 S | 12/2003 | Mayo et al. | |
| 6,679,725 B1 | 1/2004 | Kidman | |

* cited by examiner

Primary Examiner—Dhiru R. Patel
(74) Attorney, Agent, or Firm—Chase Law Firm. L.C.

(57) ABSTRACT

A novel cover plate assembly includes of two decorative face plates and a base plate for mounting electrical devices. The two face plates fabricated from steel plate are screwless and provide noble decorative appearances after the surfaces properly treated. The inner face plate is snapped into the base plate through a snap fit connection. The outer face plate is attached to inner face plate through a snap fit connection. The base plate can be molded of any flame retardant materials.

4 Claims, 9 Drawing Sheets

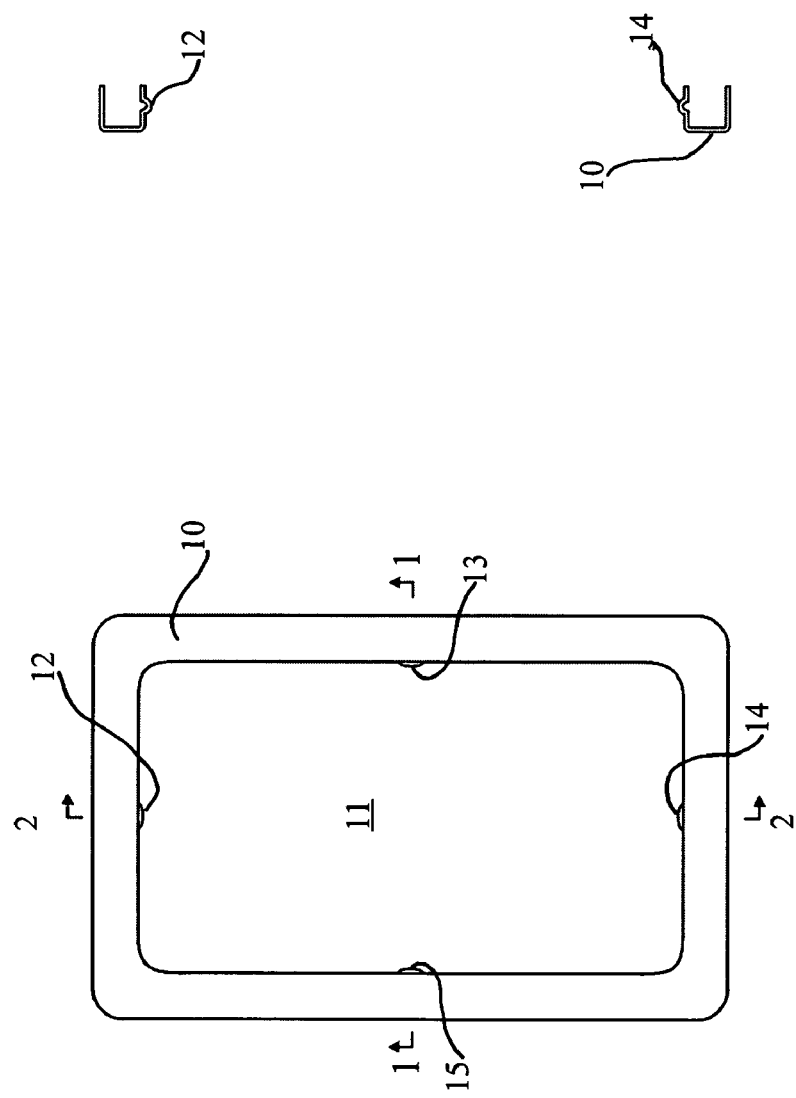
FIG. 6
FIG. 4
FIG. 5

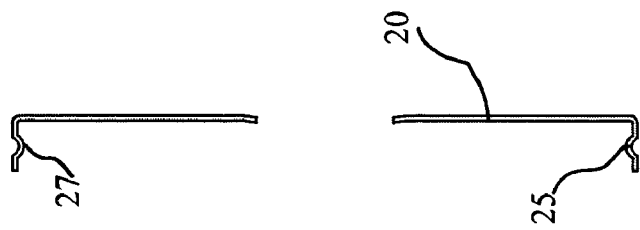
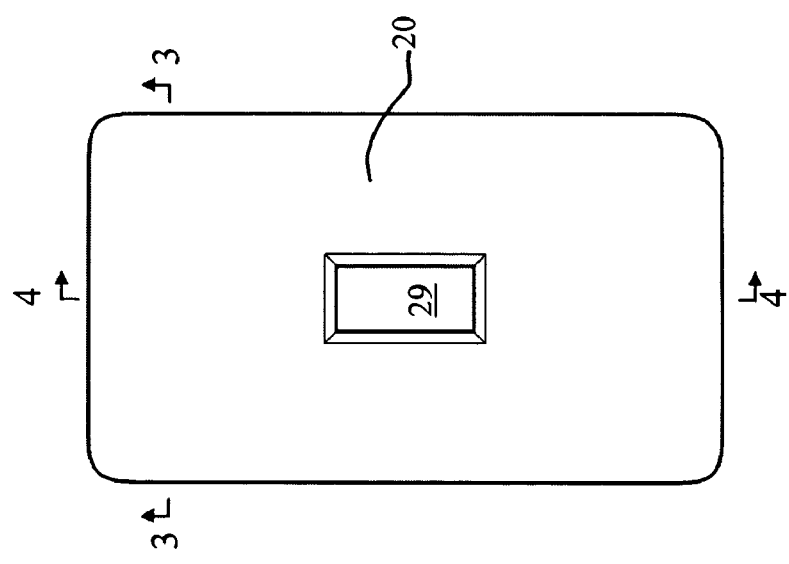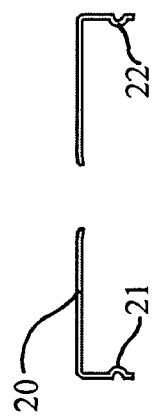
FIG. 9
FIG. 7
FIG. 8

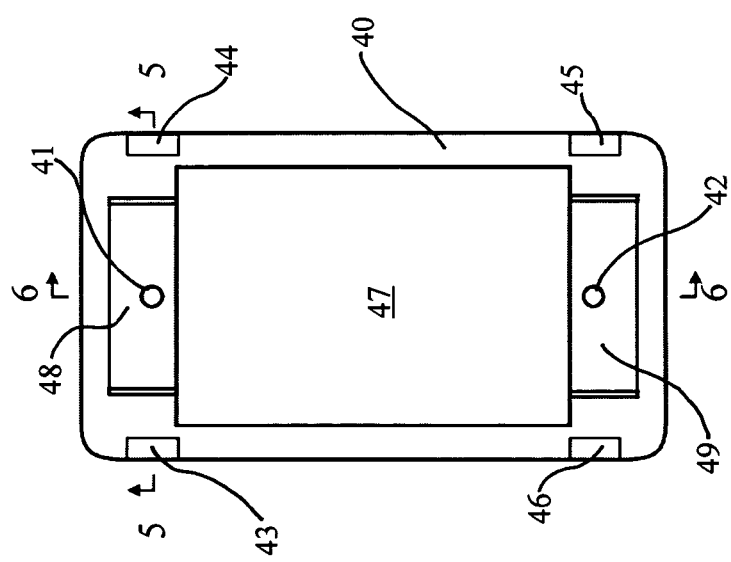
FIG. 10
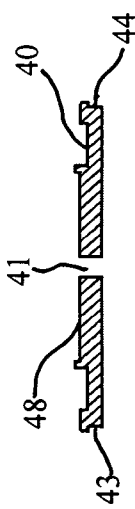
FIG. 12
FIG. 11

DECORATIVE COVER PLATE ASSEMBLY

BACKGROUND OF THE INVENTION

1. Field of the Invention

This invention relates to a novel cover plate assembly of the type used to provide support, enclosure and decorative functions for a wall box mounted switch, receptacle and the like.

2. Prior Art

Screwless switch cover plates made of metal can provide noble decorative appearances and better quality than those made of other materials such as plastics.

A novel 3-piece cover plate assembly for electrical devices comprising of two decorative face plates and a base plate with the face plates free of screw holes and fabricated from metal plate is not solved by prior art devices.

3. Objects and Advantages

Accordingly, a principal object of the present invention is to provide a novel cover plate assembly wherein no attachment screws are visible.

An important object of the invention is to fabricate the face plates of the assembly from steel plate to provide noble decorative appearances.

Another object of the invention is to provide a novel cover plate assembly having snap fit connections for easy installation and demounting.

Another object of this invention is to have the base plate mounted to a wall box against the wall to receive and maintain alignment of electrical devices.

The foregoing objectives are met by a cover plate assembly comprising a base plate and two decorative face plates.

The base plate may be molded of any flame retardant materials. The face plate are fabricated from metal plate by employing punches and presses. After properly treated, the surfaces of the metal face plates provide noble decorative appearances for room decoration.

SUMMARY OF THE INVENTION

The cover plate assembly of the present invention comprises of a base plate and two face plates. The face plates fabricated from steel plate are screwless and can provide various noble appearances for wall decoration. The inner face plate is attached to the base plate by a snap fit connection. The outer face plate is attached to the inner face plate by a snap fit connection.

BRIEF DESCRIPTION OF THE DRAWINGS

FIG. 4 is a front elevational view of the outer face plate shown in FIG. 2 and FIG. 1.

FIG. 5 is a sectional view of the face plate shown in FIG. 4 taken along lines 1—1.

FIG. 6 is a sectional view of the face plate shown in FIG. 4 taken along lines 2—2.

FIG. 7 is a front elevational view of the inner face plate shown in FIG. 2 and FIG. 1.

FIG. 8 is a sectional view of the face plate shown in FIG. 7 taken along lines 3—3.

FIG. 9 is a sectional view of the face plate shown in FIG. 7 taken along lines 4—4.

FIG. 10 is a front elevational view of the base plate shown in FIG. 2 and FIG. 1.

FIG. 11 is a sectional view of the base plate shown in FIG. 10 taken along lines 5—5.

FIG. 12 is a sectional view of the base plate shown in FIG. 10 taken along lines 6—6.

DRAWINGS—REFERENCE NUMERALS

Figure 1:
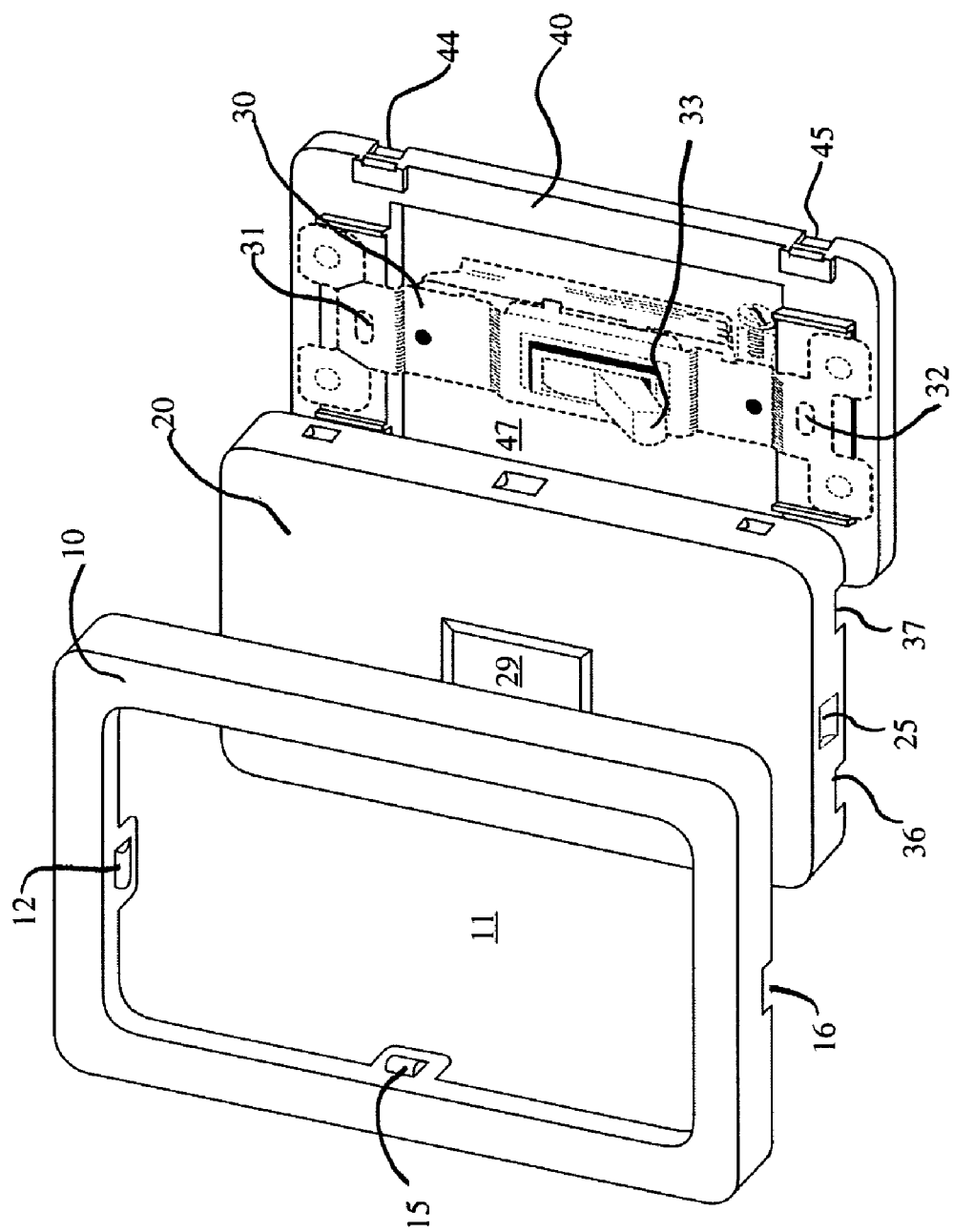
FIG. 1 is an exploded perspective view of a preferred embodiment of the switch cover plate assembly of the invention for a switch device.

81, 82, 83 and 84 little block
49 and 48 platform
47 opening
46, 45, 44 and 43 notch
42 and 41 screw hole
40 base plate
36 and 37 opening
33 control member
32 and 31 screw hole
30 switch device
29 opening
28, 27, 26 and 25 projecting snap
24, 23, 22 and 21 projecting snap
20 inner face plate
16 opening
15, 14, 13 and 12 projecting snap
11 opening
10 outer face plate

DETAILED DESCRIPTION [OF PREFERED EMBODIMENTS]

The present invention will be described in detail by reference to the drawings. The drawings are for illustration and are not intended to limit the scope of the invention.

Referring to FIG. 1, an exploded perspective view of a preferred embodiment of a switch cover plate assembly for a single wiring switch device. Inner face plate 20 is attached to base plate by pressing inner face plate 20 over base plate 40. Outer face plate 10 is attached to inner face plate 20 by pressing outer face plate 10 over inner face plate 20.

Figure 2:
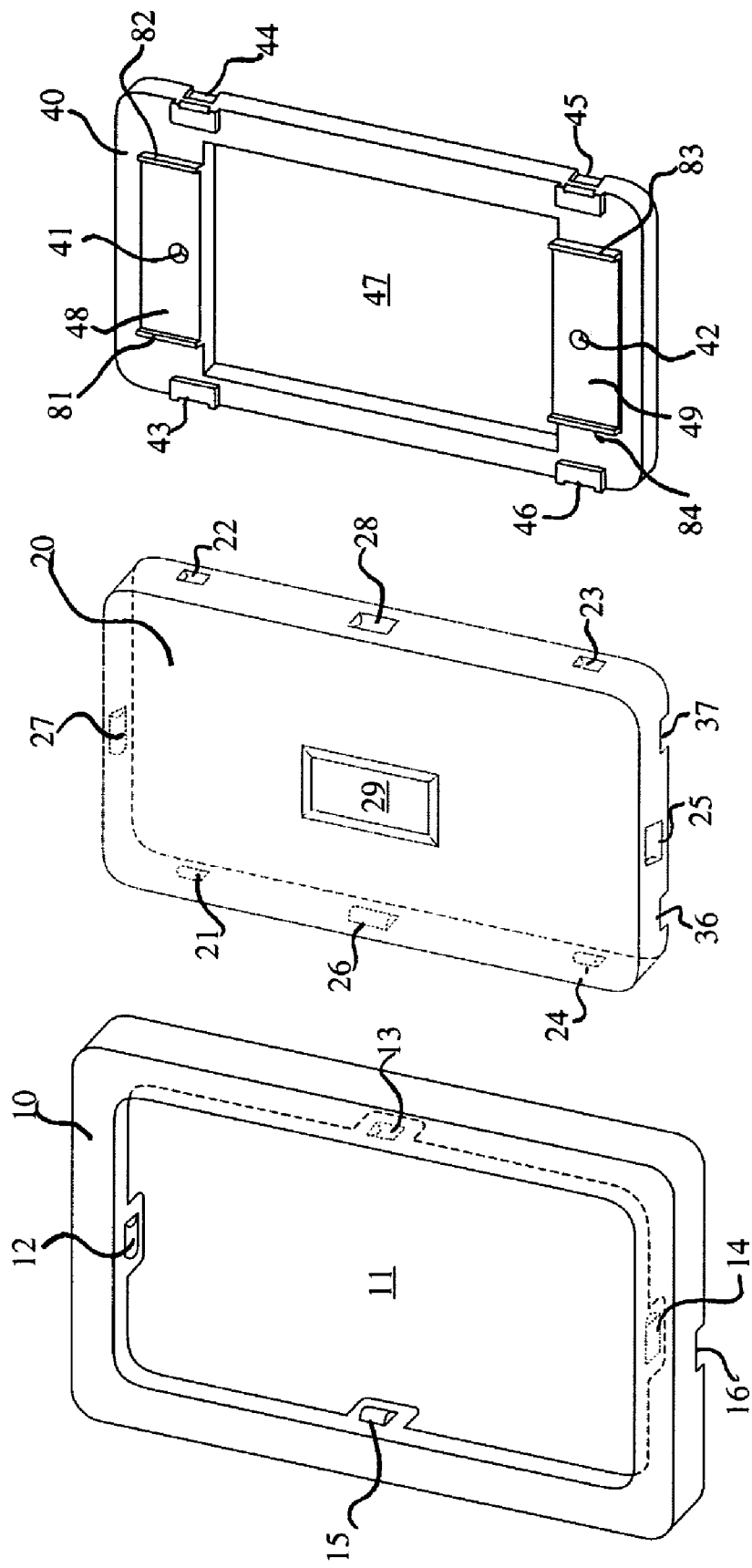
FIG. 2 is a perspective view of the base plate, the inner face plate and the outer face plate shown in FIG. 1.

FIG. 2 is a perspective view of the base plate 40, the inner face plate 20 and the outer face plate 10, respectively, shown in FIG. 1. Switch device 30 is placed on the top surface of base plate 40 as shown in FIG. 1. Base plate 40 has round screw holes which match the center-to-center spacing of screw holes 31 and 32 of switch device 30. The round screw holes are slightly larger than the diameter of standard screws. Central opening 47 at base plate 40 is adapted for receiving switch device 30. Central opening 47 is also adapted for passage of switch device 30 carrying connected wires moved from the rear side of base plate 40 to the front side for replacement of a conventional cover plate assembly.

Standard screws pass through screw holes 31 and 32 at switch device 30 and screw holes 41 and 42 at base plate 40, respectively, and are threaded into screw holes at a wall box on the wall of a building to mount both base plate 40 and switch device 30 at the same time. Base plate 40 is adapted to cover the opening in the wall for the wall box. Base plate 40 mounted to the wall box against the wall maintains alignment of switch device 30 and receives inner face plate 20 stably. Base plate 40 can receive and mount any electrical device having a yoke plate.

Switch device 30 shown is a toggle switch. The cover plate assembly of the present invention applies to any other types of electrical devices for lighting and the like.

Base plate 40 can be molded of any flame retardant materials such as polycarbonate. Platform 48 and 49 are approximately 4.0 mm in height from the bottom surface of base plate 40 to the top surface and are for supporting switch device 30. Little blocks 81, 82, 83 and 84 raised about 1 mm above the top surface of platform 48 and 49 are for switch device positioning purpose. Little blocks 81, 82, 83 and 84 can maintain switch device 30 aligned in the center of base plate 40 during screwing in.

Snap receiving notches 43, 44, 45 and 46 are symmetrically located at the outer boundary of base plate 40 for a snap fit connection with inner face plate 20.

Inner face plate 20 for this preferred embodiment is fabricated from steel plate by employing punches and presses. Inwardly projecting snaps 21, 22, 23 and 24 symmetrically located at the lateral sides at inner face plate 20 are formed by punching and are aligned with snap receiving notches 43, 44, 45 and 46 at base plate 40, respectively, for a snap fit connection. The snaps at inner face plate 20 punched from steel plate are not subject to breaking at repeatedly demounting or reinstallation.

Opening 29 at face plate 20 is adapted to permit control member 33 of switch device 30 to extend through inner face plate 20. Inner face plate 20 is attached to base plate 40 by pressing face plate 20 over base plate 40 until snaps 21, 22, 23 and 24 flex into notches 43, 44, 45 and 46 at base plate 40, respectively, and thereby fasten inner face plate 20 to base plate 40.

Openings 36 and 37 at the lateral side of inner face plate 20 are for demounting purpose. One can use a screwdriver to pry off inner face plate 20.

Notches 25, 26, 27 and 28 at inner face plate 20 punched inwardly are aligned with snaps 14, 15, 12 and 13 at outer face plate 10, respectively, for a snap fit connection. Outer face plate 10 is punched and pressed from steel plate. Snaps 14, 15, 12 and 13 are also formed by punching. Opening 11 at outer face plate 10 is adapted to receive inner face plate 20 immediately. The periphery of opening 11 is slightly larger than the outer periphery of inner face plate 20 about 0.3 mm. Opening 16 is for demounting purpose.

Outer face plate 10 is attached to inner face plate 20 by pressing outer face plate 10 over inner face plate 20 until snaps 14, 15, 12 and 13 flex into notches 25, 26, 27 and 28 at inner face plate 20, respectively, and thereby fasten outer face plate 10 to inner face plate 20.

Figure 3:
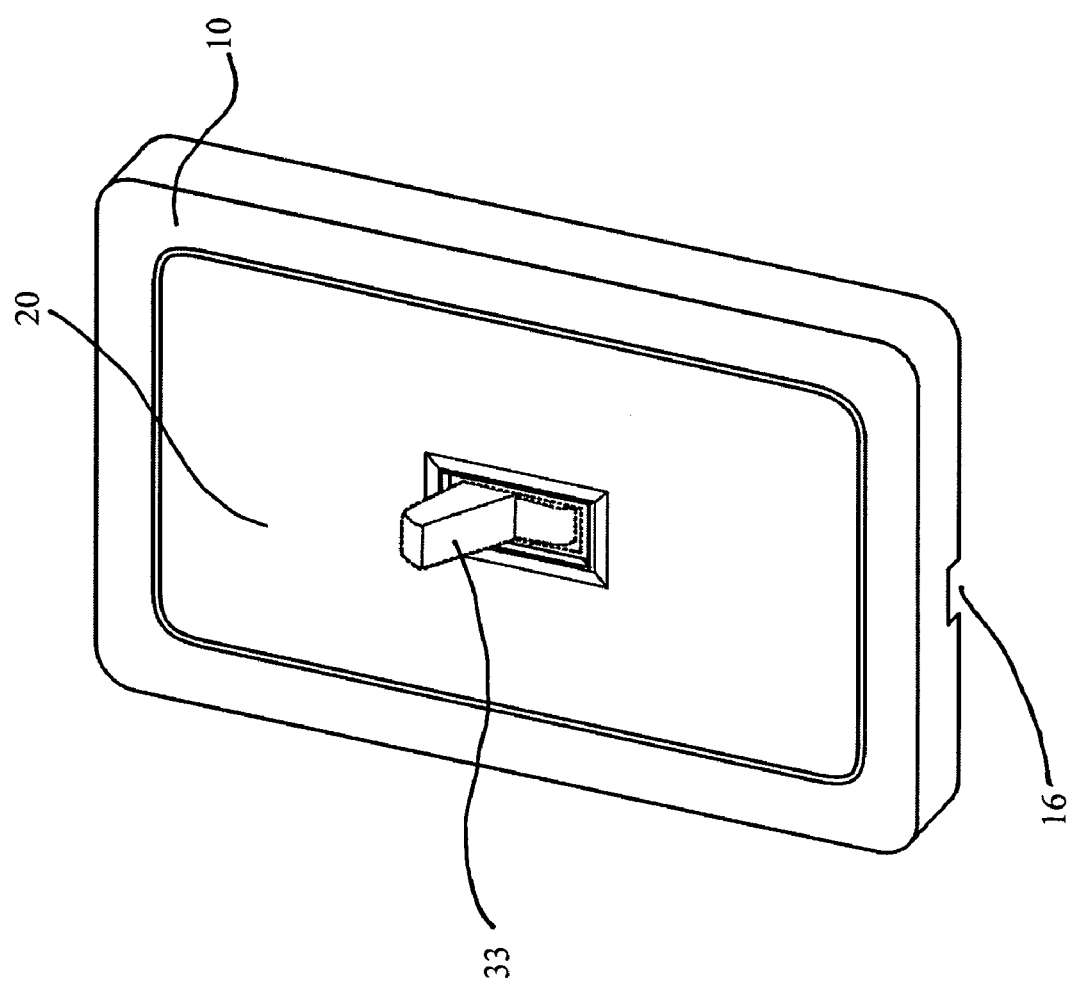
FIG. 3 is a perspective view of the switch cover plate assembly with an installed toggle switch device.

FIG. 3 shows the switch cover plate assembly of the present invention with an installed toggle switch device. The conjunction area at the front surfaces of outer face plate 10 and inner face plate 20 are at the same level.

FIG. 4 is a front elevational view of outer face plate 10 shown in FIG. 2 and FIG. 1. Outer face plate 10 is punched and pressed from steel plate. FIG. 5 is a sectional view of the face plate shown in FIG. 4 taken along lines 1—1. It shows projecting snaps 15 and 13 punched from steel plate. FIG. 6 is a sectional view of the face plate shown in FIG. 4 taken along lines 2—2.

FIG. 7 is a front elevational view of inner face plate 20 shown in FIG. 2 and FIG. 1. Inner face plate 20 is punched and pressed from steel plate. FIG. 8 is a sectional view of inner face plate 20 shown in FIG. 7 taken along lines 3—3. It shows projecting snaps 21 and 22 punched from steel plate. FIG. 9 is a sectional view of inner face plate 20 shown in FIG. 7 taken along lines 4—4. It shows notches 27 and 25 punched from steel plate.

FIG. 10 is a front elevational view of base plate 40 shown in FIG. 2 and FIG. 1. Base plate 40 can be molded of any flame retardant materials such as polycarbonate. FIG. 11 is a sectional view of base plate 40 shown in FIG. 10 taken along lines 5—5. It shows the structure of notches 43 and 44 for receiving corresponding snaps 21 and 22 at inner face plate 20 shown in FIG. 8. The height of platform 48 is approximately 4.0 mm in order to raise the switch device to permit a certain structuring space for notches 43 and 44. FIG. 12 is a sectional view of base plate 40 shown in FIG. 10 taken along lines 6—6.

Figure 13:
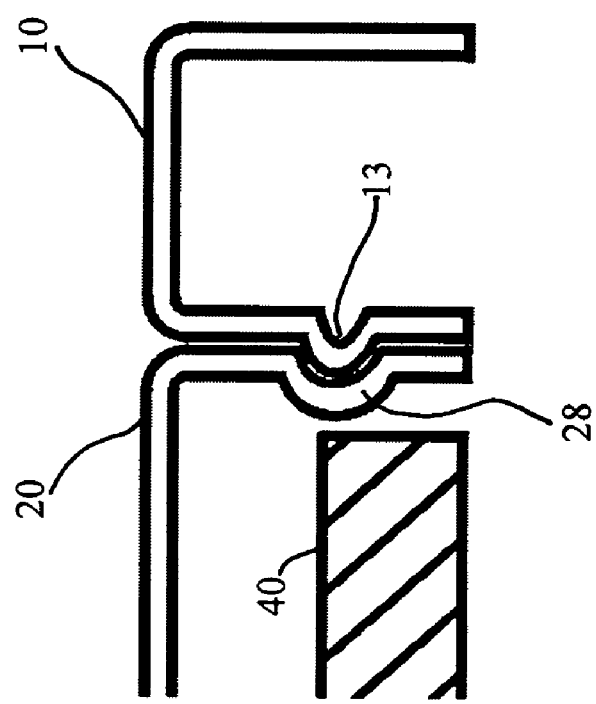
FIG. 13 is an enlarged partial cross sectional view of the snap fit connection between the inner face plate and the outer face plate.

FIG. 13 is an enlarged partial cross sectional view of the snap fit connection between inner face plate 20 and outer face plate 10. Notch 28 receives snap 13 to have outer face plate 10 interlocked with inner face plate 20.

Figure 14:
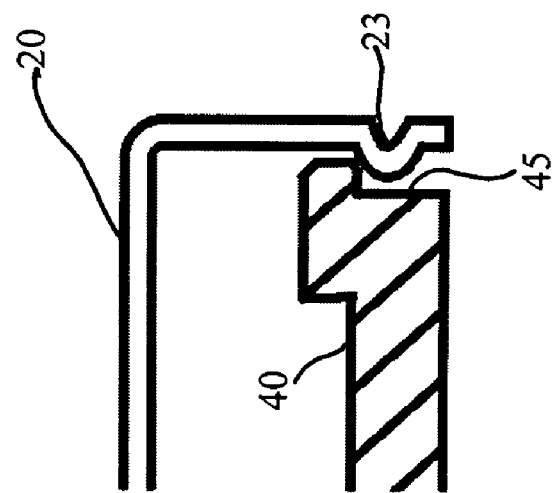
FIG. 14 is an enlarged partial cross sectional view of the snap fit connection between the base plate and the inner face plate.

FIG. 14 is an enlarged partial cross sectional view of the snap fit connection between base plate 40 and inner face plate 20. Notch 45 receives snap 23 to have inner face plate locked with base plate 40.

Figure 15:
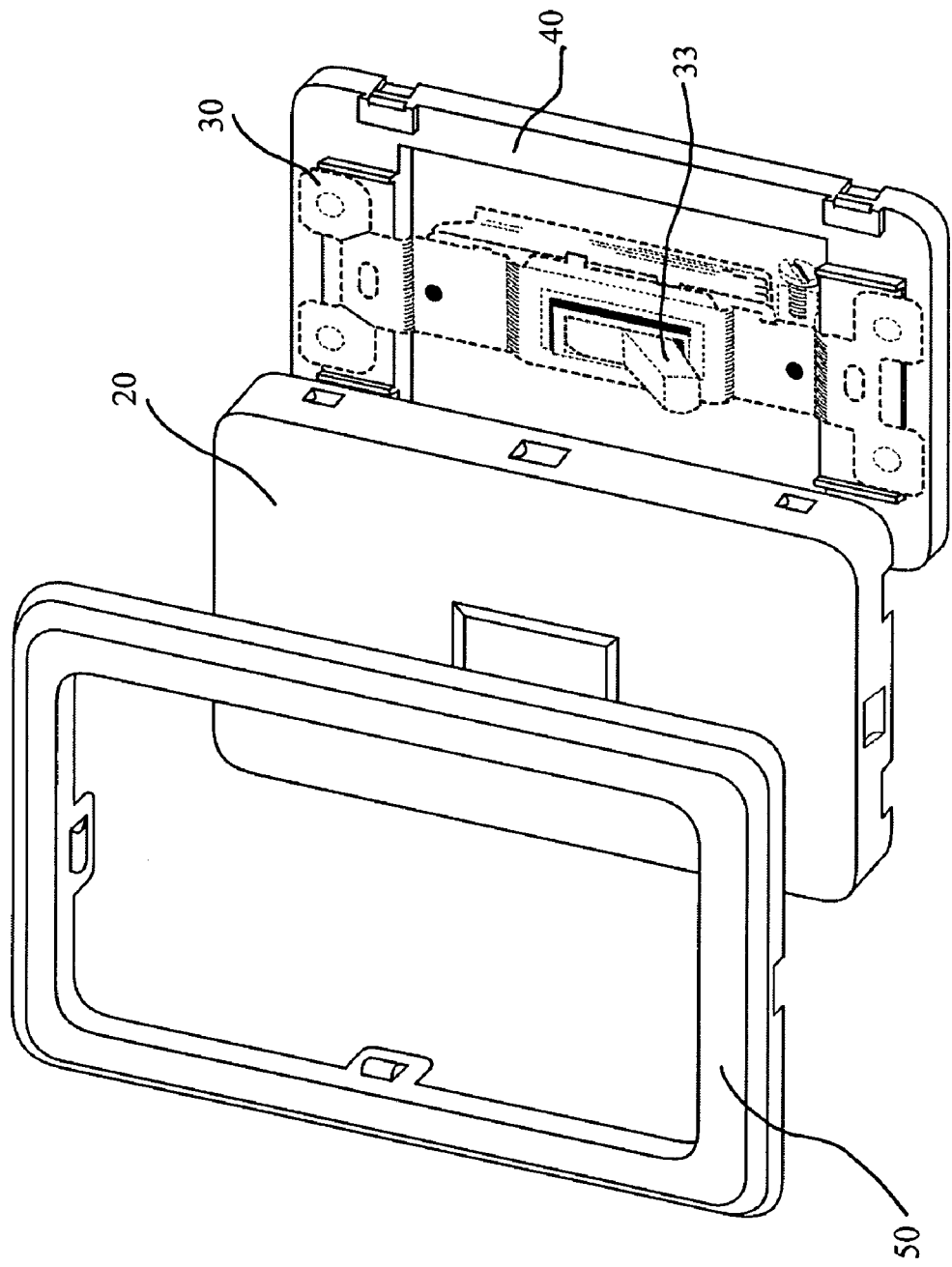
FIG. 15 is a perspective view of the assembly of the present invention with the outer face plate having an alternative decorative appearance.

FIG. 15 is a perspective view of the assembly of the present invention with the outer face plate having an alternative decorative appearance. The outer face plate 50 can be designed in various shapes as long as the central opening is adapted to immediately receive inner face plate 20 for a snap fit connection.

Figure 16:
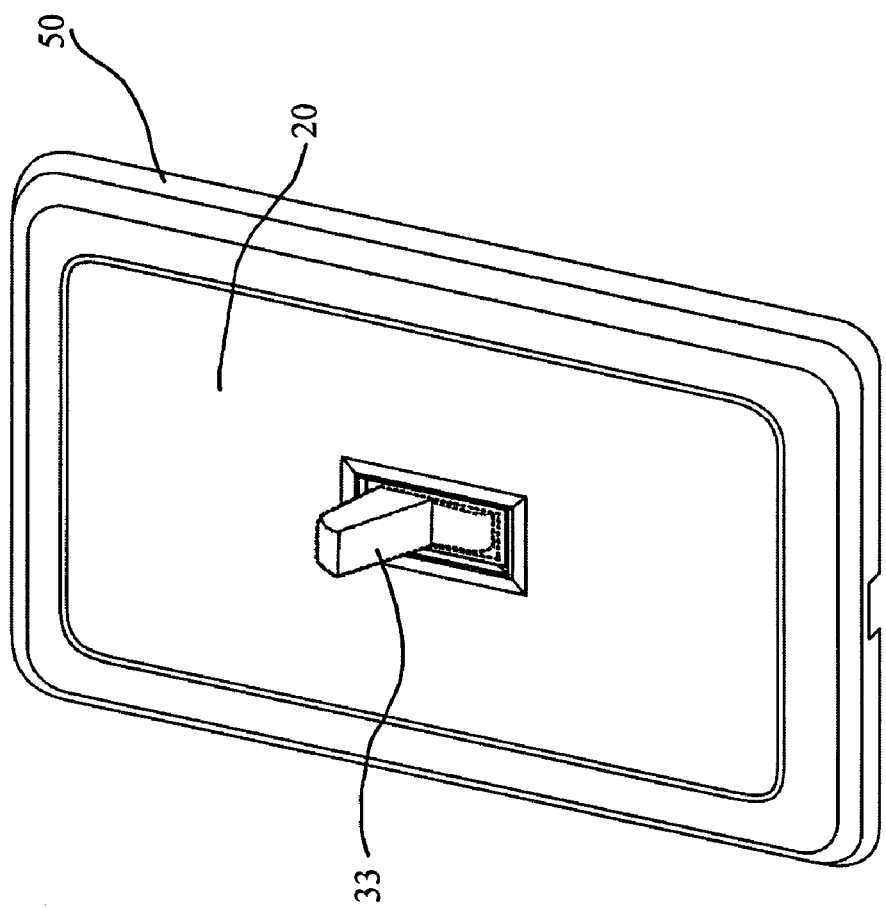
FIG. 16 is a perspective view of the switch cover plate assembly with an installed toggle switch device, showing the outer face plate having a different decorative appearance as shown in FIG. 15.

FIG. 16 is a perspective view of the switch cover plate assembly with an installed toggle switch device, showing the outer face plate 50 having an attractive appearance.

Alternatively, the face plates of the present invention can be molded.

While certain preferred and alternative embodiments of the invention have been set forth for purposes of disclosure, modifications to the disclosed embodiments as well as other embodiments thereof may occurred to those skilled in the art. Accordingly, the appended claims are intended to cover all embodiments of the invention and modifications thereof which do not depart from the spirit and scope of the invention.

Having thus described the invention, what is claimed as new and desired to be secured by Letters Patent is as follows:

1. A decorative cover plate assembly comprising:
   a base plate that comprises: a central opening adapted for receiving at least one electrical device; a top surface for supporting said electrical device having at least one pair of round screw holes; and a plurality of attachment meanings for attaching an inner face plate to the base plate wherein the attachment meanings are symmetrically located along the base plate;
   an inner face plate that comprises: at least one opening to permit each control member of said electrical device to extend through; a plurality of attachment meanings at its lateral sides for attaching the inner face plate to the base plate; a plurality of attachment meanings at its lateral sides for attaching an outer face plate to the inner face plate; and at least one opening at one of the lateral sides; and an outer face plate that comprises: an opening adapted to immediately receive the inner face plate; a plurality of attachment meanings at its inner lateral sides for attaching the outer face plate to the inner face plate; and an opening at its outer lateral side.

2. A cover plate assembly as described in claim 1 wherein said inner face plate and outer face plate are fabricated from metal plate such as steel plate.

3. A cover plate assembly as described in claim 1 wherein said inner face plate and outer face plate are fabricated from a polycarbonate material.

4. A cover plate assembly as described in claim 1 wherein said base plate is polycarbonate.

* * * * *